(12) United States Patent
Klausmeier

(10) Patent No.: US 8,578,301 B2
(45) Date of Patent: Nov. 5, 2013

(54) HIERARCHICAL EVENTS

(75) Inventor: Daniel Klausmeier, Los Gatos, CA (US)

(73) Assignee: Skadool, Inc., Los Gatos, CA (US)

(*) Notice: Subject to any disclaimer, the term of this patent is extended or adjusted under 35 U.S.C. 154(b) by 847 days.

(21) Appl. No.: 11/944,581

(22) Filed: Nov. 23, 2007

(65) Prior Publication Data

US 2008/0141145 A1 Jun. 12, 2008

Related U.S. Application Data

(60) Provisional application No. 60/867,028, filed on Nov. 22, 2006, provisional application No. 60/867,023, filed on Nov. 22, 2006.

(51) Int. Cl.
*G06F 3/048* (2013.01)
*G06F 3/00* (2006.01)
*G06Q 10/00* (2012.01)

(52) U.S. Cl.
USPC ........... 715/853; 715/751; 715/963; 705/7.18

(58) Field of Classification Search
USPC ................. 715/963, 853, 751, 758, 759, 752; 705/8, 9
See application file for complete search history.

(56) References Cited

U.S. PATENT DOCUMENTS

| | | | |
|---|---|---|---|
| 4,807,154 A | 2/1989 | Scully et al. | |
| 4,807,155 A | 2/1989 | Cree et al. | |
| 4,817,018 A | 3/1989 | Cree et al. | |
| 4,819,191 A | 4/1989 | Scully et al. | |
| 4,831,552 A | 5/1989 | Scully et al. | |
| 4,866,611 A | 9/1989 | Cree et al. | |
| 5,771,273 A | 6/1998 | McAllister et al. | |
| 5,867,822 A | 2/1999 | Sankar | |
| 5,960,406 A * | 9/1999 | Rasansky et al. | 705/9 |
| 6,018,343 A | 1/2000 | Wang et al. | |
| 6,085,166 A * | 7/2000 | Beckhardt et al. | 705/9 |
| 6,101,480 A * | 8/2000 | Conmy et al. | 705/9 |
| 6,278,456 B1 | 8/2001 | Wang et al. | |
| 6,369,840 B1 | 4/2002 | Barnett et al. | |
| 6,380,959 B1 | 4/2002 | Wang et al. | |
| 6,988,128 B1 * | 1/2006 | Alexander et al. | 709/206 |
| 7,120,879 B2 * | 10/2006 | Gutberlet et al. | 715/853 |
| 7,174,517 B2 | 2/2007 | Barnett et al. | |
| 7,188,073 B1 | 3/2007 | Tam et al. | |
| 7,236,976 B2 * | 6/2007 | Breitenbach et al. | 1/1 |
| 7,302,643 B1 * | 11/2007 | Edlund et al. | 715/703 |
| 7,673,248 B2 * | 3/2010 | Narayanaswami | 715/764 |
| 7,721,229 B2 * | 5/2010 | Frankel et al. | 715/835 |
| 7,783,988 B2 * | 8/2010 | Curran | 715/780 |
| 7,788,598 B2 * | 8/2010 | Bansal et al. | 715/810 |
| 7,814,055 B2 * | 10/2010 | Hullot et al. | 707/628 |
| 8,065,171 B2 * | 11/2011 | Nguyen et al. | 705/5 |
| 2002/0016729 A1 * | 2/2002 | Breitenbach et al. | 705/9 |
| 2002/0156787 A1 * | 10/2002 | Jameson et al. | 707/10 |

(Continued)

*Primary Examiner* — Nicholas Ulrich
(74) *Attorney, Agent, or Firm* — Lewis Roca Rothgerber LLP

(57) ABSTRACT

Systems and methods for the organization of hierarchical events are disclosed. A parent event in a first calendar application workspace classifies a hierarchy of events. A child event child event corresponds to a hierarchy of events. Identification of the parent event and a new child event results in the display of the new child event in a second calendar application workspace, the new child event being a scheduled event in the hierarchy of events that does not indicate a calendaring conflict with the parent event. A collaborative organization environment for discussion concerning the new child event may be provided.

49 Claims, 10 Drawing Sheets

(56) References Cited

U.S. PATENT DOCUMENTS

| | | | |
|---|---|---|---|
| 2004/0073615 A1* | 4/2004 | Darling | 709/206 |
| 2005/0114777 A1* | 5/2005 | Szeto | 715/710 |
| 2006/0041460 A1* | 2/2006 | Aaron | 705/8 |
| 2006/0271381 A1* | 11/2006 | Pui | 705/1 |
| 2007/0005408 A1* | 1/2007 | Boss et al. | 705/8 |
| 2007/0039024 A1* | 2/2007 | Krajcev et al. | 725/46 |

* cited by examiner

HIERARCHICAL EVENTS

CROSS-REFERENCE TO RELATED APPLICATIONS

This application claims the priority benefit of U.S. provisional patent application No. 60/867,028 filed Nov. 22, 2006 and entitled "Hierarchical Events" and U.S. provisional patent application No. 60/867,023 filed Nov. 22, 2006 and entitled "Virtual Forms." The disclosure of each of the aforementioned applications is incorporated herein by reference.

BACKGROUND OF THE INVENTION

1. Field of the Invention

The present invention generally relates to calendaring and scheduling applications. More specifically, the present invention relates to facilitating the calendaring and scheduling of hierarchical events.

2. Description of the Related Art

Events may be hierarchical in nature. For example, a business trip may constitute an event. On this business trip, an individual may visit several customers. Each customer visit may also be considered an event. One or more of the customer visits may include multiple meetings that may constitute even more events. In the example shown in FIG. 1A, the business trip event (110) includes customer visit events (120); the customer visit events (120) include individual meeting events (130). The example illustrated in FIG. 1A exhibits a hierarchy of events that is three-levels deep. While FIG. 1A is for a hierarchy three-levels deep, other hierarchies exist with greater or fewer levels.

Regardless of the particular depth and detail of any given hierarchy, each event in a particular hierarchy includes a parent-child relationship. For example, in the business trip of FIG. 1A, a customer visit (120a) is a child of the business trip event (110). The same customer visit (120a), however, is also the parent of a meeting with a particular person affiliated with that customer (130a and 130b).

Hierarchical relationships are not effectively managed by existing calendaring or organizer systems. In Microsoft Outlook (as shown with respect to the business trip of FIG. 1A), an event that has a hierarchical relationship to other events is handled by overlapping those individual events on the same calendar. This 'overlap' creates the false appearance of conflicting events. As illustrated in FIG. 1B, such overlap may confuse prior art calendaring systems into believing that a conflict exists.

For example, if a user has a business trip, the user would reserve their time as busy for that trip. This reservation serves as an indication that the user is not available for other events during the trip's scheduled time. While the user is on that trip, however, the user may be free for events associated with that trip even though their calendar shows them as busy. As such, the user must proactively recognize that the overlapping of events does not constitute a true scheduling conflict. In a complex hierarchy of events, keeping track of true or false conflicts may be time consuming, confusing, and subject to error. Other calendar systems such as Apple iCal, Google, Yahoo!, Zimbra, Trumba, and Meeting Maker have similar limitations as Microsoft Outlook with respect to scheduling hierarchical events.

Alternatively, separate calendars may be created for specific parent-type events (e.g., a vacation) to create 'containers' for events. For example, one calendar may represent a vacation and have several child events scheduled and 'contained' therein. A business trip may represent another calendar with individual meeting events scheduled and contained therein. This 'container' method is likewise difficult to manage. A calendar created as a container for one set of events (e.g., a personal calendar) does not provide a way to reserve time on other calendars (e.g., a business calendar). This separate calendar methodology may leave the impression that the user is available for other events such as business meetings when, in fact, the user is out of the office on vacation. The user, in this methodology, is thereby forced to create an event corresponding to this vacation calendar on their other calendars it they want to reserve time for the vacation.

In prior art scheduling applications, the use of time reservations for events helps to determine the availability of an individual for other events. In systems such as Microsoft Outlook, three types of time reservations may be supported for events: Busy, Tentative, and Free. "Busy" indicates that the individual should be shown as not available for other events during the event's scheduled time. "Tentative" indicates that the individual should be shown as "tentatively available" for other events during the event's scheduled time. "Free" indicates that the individual should be shown as available during the event's scheduled time.

Since there may be multiple simultaneous events, the availability of an individual at a given time is determined by the time reservations of all the events scheduled at that time. If there are any events scheduled at that time with a time reservation of busy, then the individual is assumed to not be available for a new event at that time. If there are no events at that time with a time reservation of busy but there exists events at that time with a time reservation of tentative, then the individual is assumed to be tentatively available at that time. If there are no events at that time with a time reservation of busy or tentative, then the individual is determined to be free at that time. The use of this method in the prior art calendaring and scheduling systems is inadequate when for expressing the availability of an individual for events within a hierarchy. For example, if the user creates a "business trip" event on their calendar with a time reservation of "Busy," then the calendar does not show the individual as available for meetings during that business trip.

There is, therefore, a need in the art for managing and navigating the hierarchical relationship of events in such a way that it may he applied to existing calendar systems.

SUMMARY OF THE CLAIMED INVENTION

In a first claimed embodiment of the present invention, a system for organization of hierarchical events is disclosed. The system includes a first and second computing sub-system. The first computing sub-system generates a parent event classifying a hierarchy of events. The first computing sub-system is associated with a planner of the parent event. The second computing sub-system generates a new child event corresponding to the hierarchy of events. The second computing sub-system is associated with an invitee to at least a portion of the parent event. The system further includes a server configured to generate information related to the display of the new child event in a calendar application displayed at the computing sub-systems.

A second claimed embodiment of the present invention concerns a method for organization of hierarchical events. The method includes receiving an identification of a parent event in a first calendar application workspace. The parent event classifies a hierarchy of events. An identification of a new child event is also received. The new child event corresponds to the hierarchy of events. The new child event is displayed in a second calendar application workspace. The new child event is a scheduled event in the hierarchy of events and does not indicate a calendaring conflict with the parent event.

In another embodiment of the aforementioned method, hosting of a collaborative organization environment is provided. The organization environment allows for a collaborative space for discussing the new child event.

A third claimed embodiment of the present invention provides for a computer-readable storage medium. Embodied on the medium is a program. The program is executable by a processor to perform a method for organization of hierarchical events. The method executed by the processor includes receiving an identification of a parent event in a first calendar application workspace. The parent event classifies a hierarchy of events. An identification of a new child event is also received. The new child event corresponds to the hierarchy of events. The new child event is displayed in a second calendar application workspace. The new child event is a scheduled event in the hierarchy of events and does not indicate a calendaring conflict with the parent event.

In another embodiment of the aforementioned computer-readable storage medium and associated method, hosting of a collaborative organization environment is provided. The organization environment allows for a collaborative space for discussing the new child event.

BRIEF DESCRIPTION OF THE DRAWINGS

FIG. 4A illustrates the selection of an event from the calendar application of FIG. 3 and a corresponding dashboard.

FIG. 4B illustrates the expansion of the event summary section module of FIG. 4A as a result of selecting a scheduling tab.

FIG. 5 illustrates the dashboard of FIG. 4A whereby the event calendar module has been expanded.

FIG. 6 illustrates the selection of a child event in a calendar application, the child event being a part of a larger hierarchical event.

DETAILED DESCRIPTION

Figure 2:
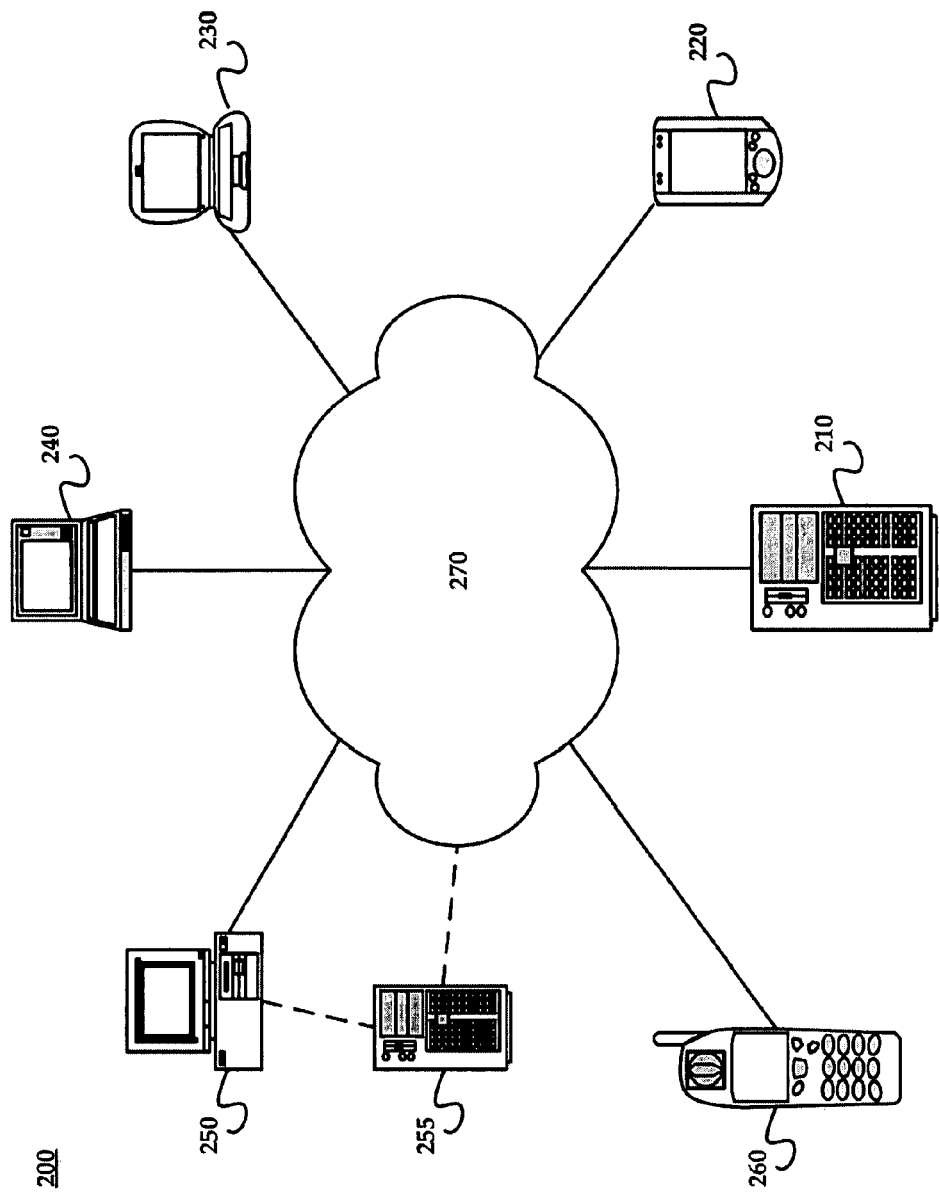
FIG. 2 illustrates an exemplary network of computing devices with varying degrees of calendaring functionality.

FIG. 2 illustrates an exemplary network 200 of computing devices (sometimes referred to as computing sub-systems) with calendaring functionality. A variety of computing devices may be utilized in the practice of the present invention including a personal digital assistant (PDA) 220, laptop computers (230 and 240), a desktop computer 250, or a cellular device 260. Other computing devices such as thin clients, workstations, and portable handheld computing devices may also be used in practicing the presently claimed invention.

A calendar application may be a desktop application launched from a personal computer (e.g., laptops 230 and 240 or desktop 250) or an enterprise calendaring solution hosted by enterprise server 255. A calendar application may include an Internet-based application executed in an Internet browser, the application accessed via a website corresponding to a hosted service (e.g., at server 210). Such a web-based application may operate utilizing the likes of Ajax or Flash although embodiments of the present invention are not limited by a particular type of software application or the hosting of the same.

The functionality offered by the present invention may be practiced without particular limitations as to hardware device (e.g., desktop versus laptop versus PDA), software (e.g., calendar application or operating system), or means for connecting to communications network 270. For example, one device (e.g., PDA 220) may connect to communications network 270 using a wireless connection and an IEEE 802.x protocol. Laptops 230 and 240, on the other hand, may connect to communications network 270 utilizing a cable modem and dial-up connection, respectively. Desktop computer 250 may connect utilizing a digital subscriber line (DSL) and cellular device 260 may communicate over the communications network 270 using the General Packet Radio Service (GPRS) and available radio spectrum.

Communications network 270 may include various communications facilities and mediums (e.g., telephony, wireless, satellite, cable, or optic). These facilities and mediums may be provided by telecommunications companies and Internet Service Providers. Communications network 270 may be a geographically widespread network (e.g., a Wide Area Network (WAN)) like the Internet that depends upon the aforementioned communications facilities to link various network segments. The communications network 270 may also be or be composed of smaller linked communications networks such as Local Area Networks (LANs). A LAN may include a group of computers and other devices dispersed over a relatively limited area and connected by a variety of broadband communications links. LANs may take on a variety of configurations including server-client, peer-to-peer, peer groups, or a combination of the same. Communications network 270 may also be a closed, proprietary network.

The various computing devices may not be immediately connected to the communications network 270. For example, and as shown with respect to desktop computer 250, an intermediate computing device such as a centralized or enterprise server 255 may intermediately couple the computing device 250 to the network. Various ancillary applications (e.g., enterprise applications or firewalls) may be implemented on the enterprise server 255 to allow for or enhance certain end-user functionality. Similarly, PDA 220 maybe coupled to the communications network 270 via a Wireless Access Protocol (WAP) gateway. Other devices such as Personal Client Servers (PCS) or Smart Device Servers (SDS) may be implemented subject to the particular nature of a device in the network and/or a particular network connection. Similarly, any variety of access points and routers may be implemented to provide communicative coupling of the aforementioned devices and communications network 270.

A communicative coupling to the communications network 270 may not be immediately present. A device may temporarily lack a connection (direct, intermediate or otherwise) to the communications network 270. For example, a user may be using their laptop on an airplane, which may lack the means to connect to a communications network 270.

Figure 3:
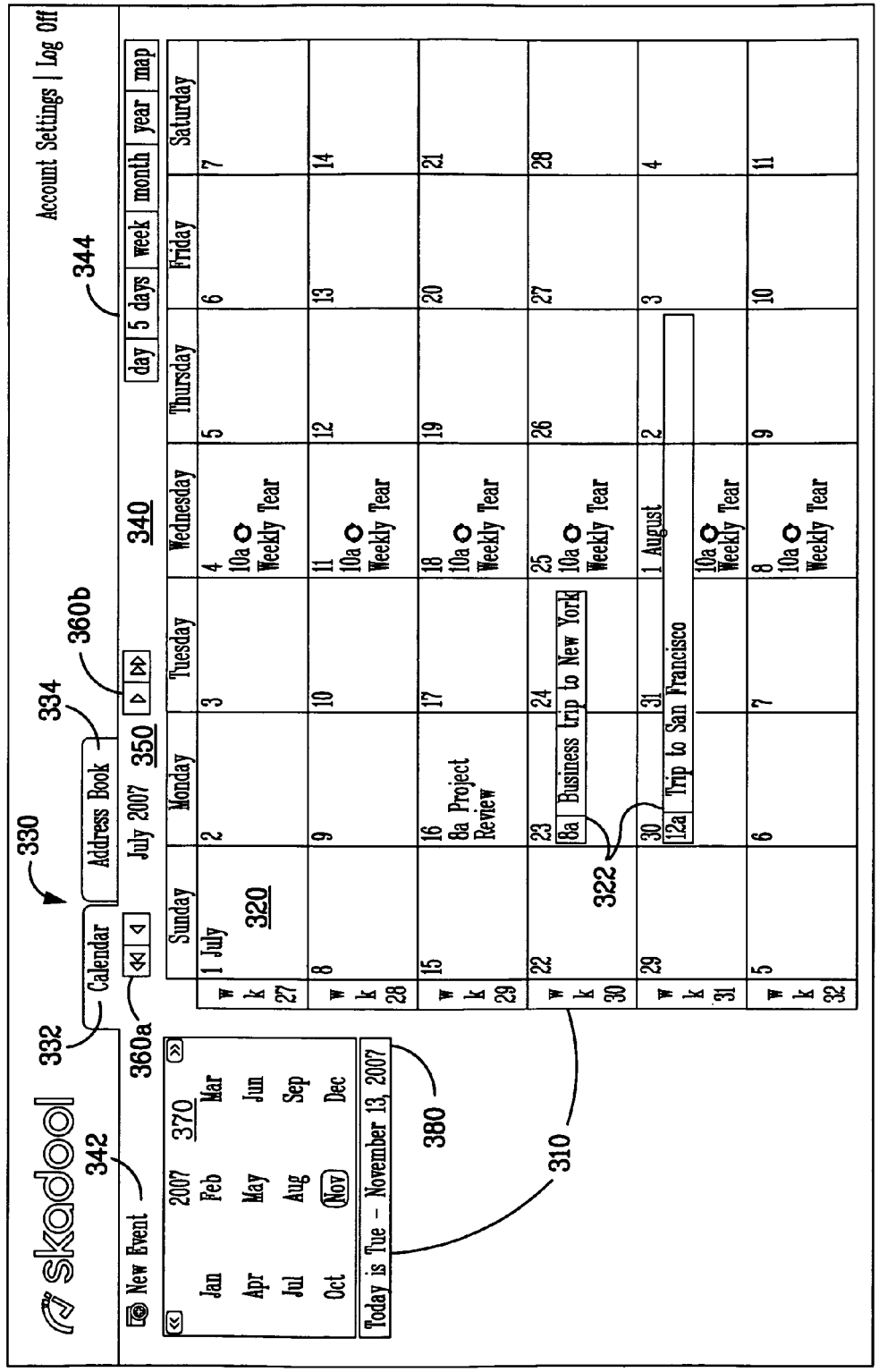
FIG. 3 illustrates an exemplary calendar application that may be utilized to schedule hierarchical events.

FIG. 3 illustrates an exemplary calendar application 300 that may be utilized in practice of the present invention. In the course of the present specification, reference to a calendar application may refer to the calendar application proper (e.g., an application that results in the display of the calendar grid 320). Similarly, a calendar application may refer to a more robust software package including calendar, address book, and so forth.

Calendar application 300 includes calendar application workspace 310 where menus, events, and other information may be displayed and selected with respect to the actual calendar grid 320. Calendar grid 320 may, in some instances, constitute a workspace in that it offers selection, editing, and other scheduling functionality. The layout of calendar application 300 is exemplary. Different graphic layouts may be implemented while maintaining the functionality associated with various elements as discussed herein. In that regard, not all functional elements are required for the operation of calendar application 300.

Main calendar grid 320 of FIG. 3 is presently in a month view as governed by view selection tool bar 344 as discussed in more detail below. Main calendar grid 320 displays various events 322. An event 322 may, in some situations, constitute a parent event. Event 322 may also constitute a child event. Certain events 322 may be siblings of one another (i.e., part of a common hierarchy).

A user may click or otherwise select an event 322 to open, edit, work on, or otherwise view information concerning that particular event 322. For example, selecting a particular event 322 may open a 'zoom popup box' that displays more details for that event 322. Various modes of workspace management, including a popup box, are disclosed in U.S. provisional patent application No. 60/867,023. In the case that an event 322 is a parent event, selecting the parent event and launching a popup box may allow for a user to add information, (e.g., a child event), indicia of these selections may be received by a user computing device and/or at a central server. In FIG. 3, no events are currently selected.

Included in the calendar application 300 are top level tabs 330. Top level tabs 330 allow a user to switch between different applications within the overall calendar application program. For example, top level tabs 330 as depicted in FIG. 3 user to switch between a calendar application 332 (currently selected) and an address book 334. Other applications maybe available including a note pad, task list, journal, e-mail, and so forth.

Calendar application 300 also includes a header row 340. Header row 340 includes a new event button 342 that allows a user to create a new event. Header row 340 also includes a view selection tool bar 344. View selection fool bar 344 allows a user to navigate between different views of a calendar including day, five days, week, month, and year. As shown in FIG. 3, the month view is selected from the view selection tool bar 344. The view selection tool bar 344 of FIG. 3 also includes a map button as discussed in further detail below.

A month identifier 350 also appears in the header row 340. The month identifier 350 identifies the present month view as shown in the calendar grid 320. Month identifier 350 may, depending on a particular view selection, reflect more, less, or additional information such as week, day, year, and so forth. Bracketing the month identifier 350 are navigation buttons 360a/b that allow a user of the calendar application 300 to navigate back and forth between different date ranges of the calendar grid 320. For example, and with respect to month view as shown in FIG. 3, the navigation buttons 360a/b allow a user to move from July 2007 to June 2007 and August 2007 using the outer double-arrow buttons. The user may move a week (i.e., a row) at a time using the inner single-arrow buttons.

Calendar application 300 of FIG. 3, in the left-most calendar application workspace 310, includes a navigation calendar 370. Manipulation of navigation calendar 370 allows a user to navigate through different months using one-click functionality as an alternative to navigation buttons 360. The today link 380, located below the navigation calendar 370, may be selected in order to navigate the calendar grid 320 to the corresponding date using one-click functionality.

Figure 4A:
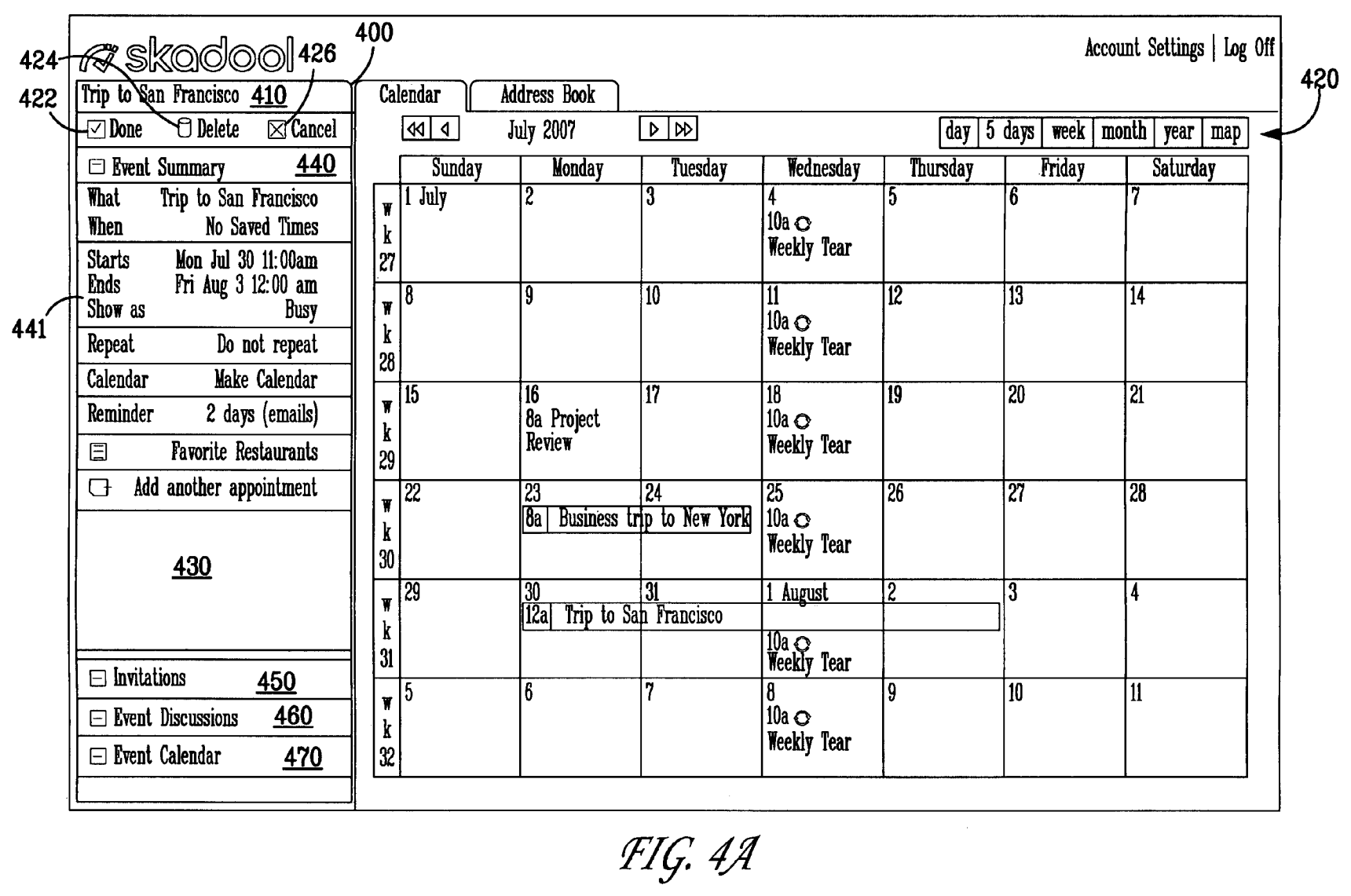

FIG. 4A illustrates the calendar application 300 of FIG. 3 whereby the event 322 'Trip to San Francisco' has been selected by a user. Selection of this event 322 may be effectuated through a point-and-click of a mouse or other selection entry means on a computing device (e.g., voice control or touch screen). Once the event 322 is selected, an event dashboard 400 for the selected event is displayed in the workspace 310 formerly occupied by the navigation calendar 370 of FIG. 3. The placement of event dashboard 400 is exemplary. Other graphic layouts may be implemented while maintaining the functionality associated with the dashboard 400

The event dashboard 400 summarizes data associated with a selected event arid may use other graphic interface tools (e.g., pop up windows and balloons) to access and edit details of the data for the selected event (e.g., an event 322). The event dashboard 400 and other interface tools, including those disclosed in U.S. provisional patent application No. 60/867,023, allow a user to view and edit a large amount of data associated with an object or feature directly from the main calendar grid 320 of the calendar application 300. Like all aspects of the present invention, the layout of information within the event dashboard 400 is exemplary; various layouts may be implemented. Further, not all elements described herein are necessarily required for the operation of event dashboard 400.

Event dashboard 400 includes an indication of the event title in the header 410 of the dashboard 400. Event dashboard 400 further includes a button row 420, which, in FIG. 4A, includes a 'done' button 422, 'delete' button 424, and 'cancel' button 426, The 'done' button 422 operates to close the selected event 322 and save any edits whereas the 'delete' button 424 will delete the event 322. The 'cancel' button 426 will cancel any edits (e.g., additions, deletions, etc.) and close the event 322.

The dashboard 400 also includes an accordion section 430 that allows for individual sections to be expanded and retracted. In the accordion section 430 of the dashboard 400, a user can single click on any particular section causing the selected section to expand while others collapse. When an event is first selected, a default accordion section is automatically expanded. As shown in FIG. 4A, an event summary section 440 is currently expanded. The event summary section 440 identifies the selected event 322 and where it is occurring (if such information was previously provided). The summary section 440 further provides a start and end time as well as a status designator (e.g., busy, out of office, or free). Options with respect to repetition of the event and reminders also appear in the summary section 440 as does a designator as to what calendar the event appears on (e.g., a personal calendar versus a business calendar).

Also included within the accordion section 430 of the dashboard 400 is an invitations module 450, which is presently collapsed in favor of the aforementioned summary section 440. Through the invitations module 450, various users/participants may be invited to participate in the event 322. Participation may also involve being able to assist in the planning of the event 322 through a collaborative organization environment, which may be a part of or otherwise generated, by discussion module 460 as further described below. Invitations may be extended with respect to the parent event or any number of child events. Extended invitations may differ between the parent and child, or any sibling events therein. Information concerning to whom invitations were extended, the status of acceptance or denial of an invitation, any message accompanying an invitation, and the means utilized to invite a participant (e.g., e-mail, a native messaging system (as described below), SMS, or instant messenger) may also be indicated by the invitation module 450.

The dashboard 400 of the calendar application 300 also provides for a discussion module 460. The discussion module 460 allows for users to view and participate in event discussions, which may take place within a calendar workspace or result in the launch of another 'window' displaying a web page or other collaborative environment. Tine discussion module 460 may provide for feedback only among invited participants to a particular event or for any person with, access to the calendar information, the parent event, or a related sibling event. Discussions may occur through one or more of an instant messenger application, native messaging application (e.g., through a messaging service akin to electronic-mail but otherwise provided by an entity hosting the discussion board and/or service), or a message board. Discussions may be 'in the moment' or a history/log may be maintained such that users may view a previously concluded or presently inactive discussion. Other information may be provided in or through the discussion module 460. Examples of functionality include polling, blogging, linking to other websites, photo and video posting, and map functionality.

With respect to the aforementioned map functionality, a portion of the calendar application workspace may support a concurrent or dedicated map view as may be activated through selection of the 'map' button as initially referenced in the context of FIG. 3. Selection of map functionality may allow for the physical position of events to be viewed in addition to the temporal positions provided by the other views. This map view may be accessed from the workspace in a fashion similar to the time window views by putting a map view on the view selection tool bar 344.

When map view is selected, a navigation calendar may be used to control what events appear on the map. For instance, only events scheduled on the selected dates of the navigation calendar may appear on the map. The map view may support features such as zooming and panning to navigate to different regions of the map. In addition, a list of events on the selected dates may be displayed next to the map. Selecting an event may cause the map to automatically navigate so that the selected event is in the view. Events may also be selected directly on the map. Like the time window views, selecting an event may cause an event form (or dashboard) to appear giving access to view and edit event details such as scheduled time.

Additionally, the event may be selected from the calendar of one of the time window views. An event form may appear in the left column giving access to additional data about the event. While this form is displayed, the user may select map view from the workspace and see the event on the map. The form of the left column may still remain. In the view giving access to the detailed event data while viewing the event on the map. Other events on the same date as the selected event may also appear in the map view. The map feature may be implemented using application programming interfaces (APIs) offered by providers of map services (e.g., Google Maps, Yahoo! Maps, or Microsoft Live) or as a separate third-party application.

Information related to events and accommodations may he provided by the discussion module 460. For example, the discussion module 460 may operate to launch, control, or otherwise link to a website or other collaborative space including addresses and phone numbers of accommodations as well as services and attractions such as restaurants, museums, night clubs, and other points of interest. Driving directions or public transportation information may also be provided. This collaborative space may also be shown directly on the dashboard by expanding the dashboard to the right to cover or partially cover the calendar grid.

Information provided by third-parties may be integrated with the discussion module 460 such that information about local services and attractions may be easily searched, located, and scheduled. Discussion module 460 may provide for integrated reservation services (e.g., through Open Table for restaurants) or otherwise provide information to secure a reservation through normal human interactions (e.g., a phone call to a restaurant). Various access permissions may be provided to invitees, participants, or other users of the service (e.g., user names and passwords or keyed URLs) and, particularly, any collaborative space generated or controlled by the discussion module 460. Similar securities may exist through, the course of the present invention with respect to access to information, editing, or introduction of information.

Also included within the accordion section 430 of the dashboard 400 is an event calendar module 470 that identifies the actual events that may have been calendared for a particular event 322. The events identified may he the child events of the selected event. The event calendar module 470 is discussed in additional detail with respect to FIG. 5 below.

Figure 4B:
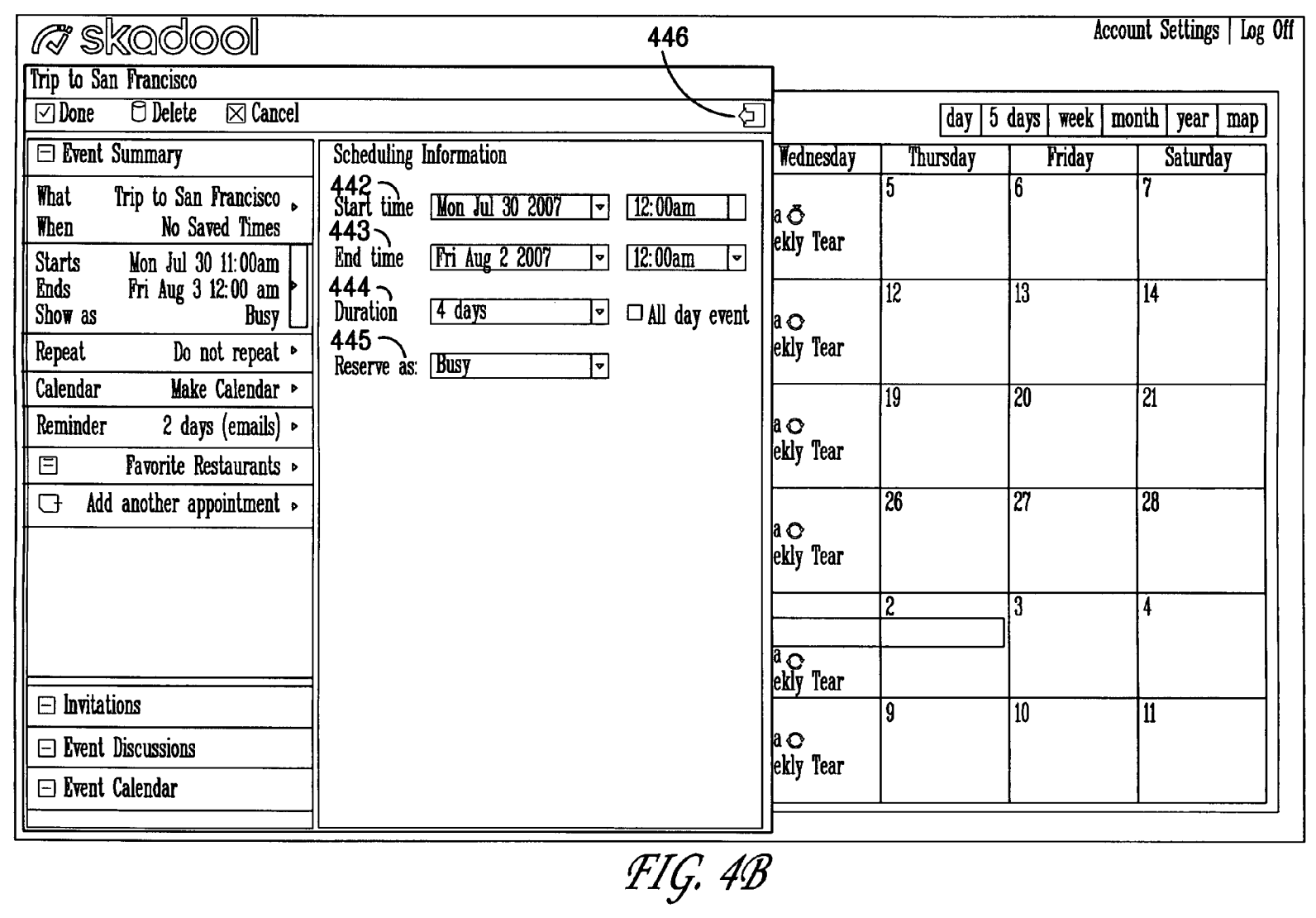

Certain sections or modules of the dashboard 400, too, may include an expansion tab. By clicking or selecting the tab, the dashboard 400 may expand to give a user the ability to edit certain details concerning an event 322. For example, as shown in FIG. 4B, the event summary section 440 has been expanded by clicking on the scheduling tab 441. Through expansion of, specifically, the event summary section 440, a user may now view and edit start and end times for an event 322. Through selection of the aforementioned scheduling tab 441, the dashboard may expand to the right to give a user control of the scheduled time and time reservation for a corresponding event. This expanded dashboard is shown in FIG. 4B where user control of the scheduled time and time reservation is provided in the form of a series of drop down menus. The user may identify start time 442 and end time 443 as well as duration 444 and reservation status 445 (e.g., busy, tentative, free). This expanded, section (i.e., workspace) may be collapsed by clicking or selecting the collapse/reduction icon 446. Alternatively, a user may also click or select the scheduling tab 441 or select any other tab or module in the accordion section 430 of the dashboard 400.

Creation of a new event may be similar to selecting an event on calendar grid 320 of FIG. 3 except that the user may instead select the New Event button 342. Like selecting an event, a dashboard (like dashboard 400 as shown in FIG. 4A) may appear after the user selects the New Event button 342. The user may click on tabs like those on dashboard 400 to expand the dashboard to edit specific information about the event such as scheduled time. Alternatively, to create a new event, the user may select a date on calendar grid 322 (like that of FIG. 3) by clicking on a date. The selected date may show a "New Event" link that, when selected, opens a dashboard like dashboard 400 of FIG. 4A that gives the user access to edit event details associated with the new event.

Figure 5:
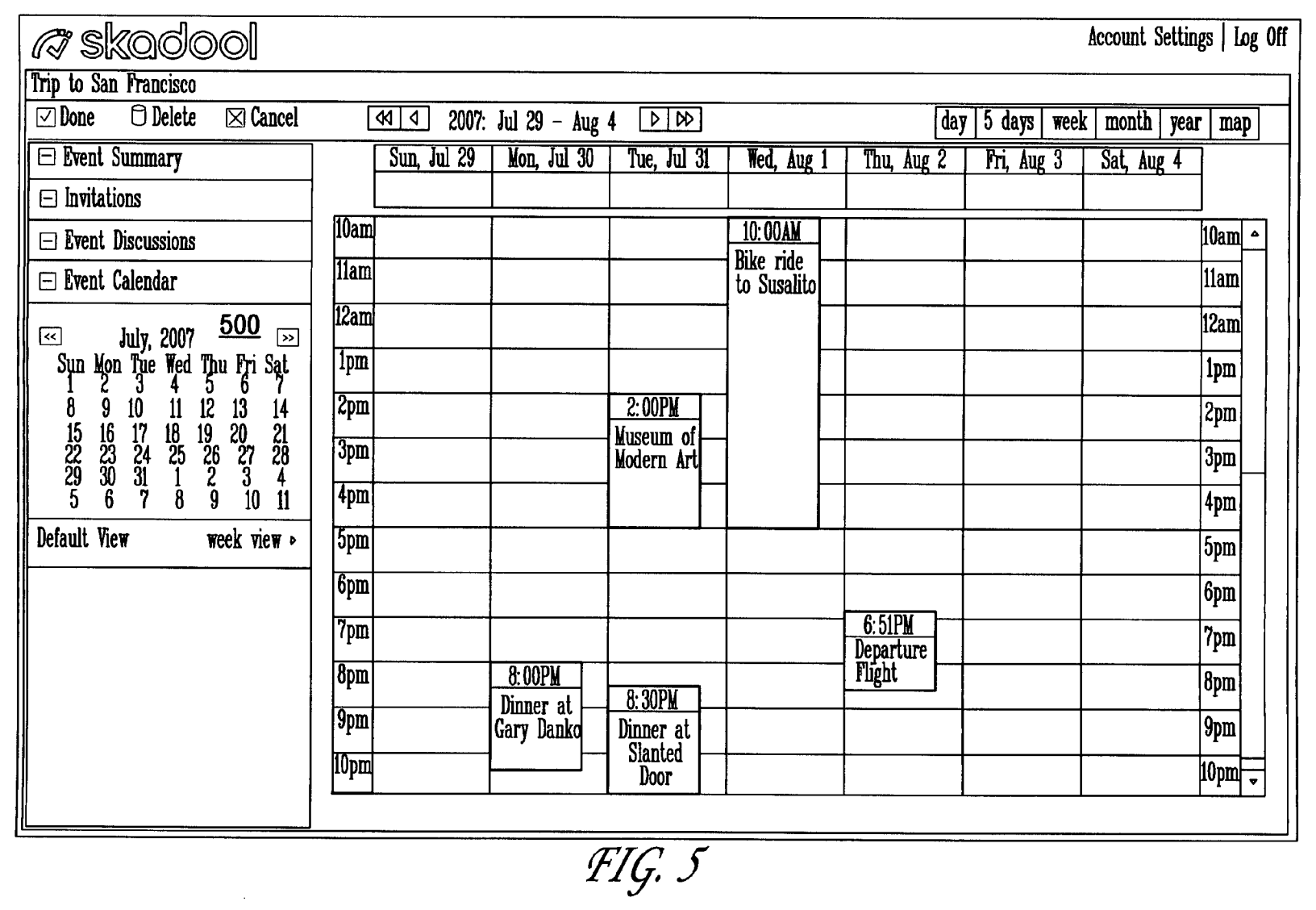

FIG. 5 illustrates the dashboard 400 of FIG. 4A whereby the event calendar module 470 of accordion section 430 has been expanded. The dashboard 400 has also been expanded to the far right covering the entire workspace to expose a calendar grid 320 in a new workspace. In FIG. 5, the corresponding navigation calendar 500 may be navigated to various dates through the click-and-drag of a mouse. Manipulation of the navigation calendar 500 of FIG. 5 results in a corresponding adjustment of the calendar grid 320. For example, FIG. 5 shows July 29 through August 4 having been highlighted in the navigation calendar 500. As a result, the calendar grid 320 shows the corresponding dates. If the user were to de-select August 4 and adjust the range of dates highlighted on the navigation calendar 500 to August 3, then the calendar grid 320 would make a corresponding adjustment listing only those six days instead of the seven days presently displayed. This may be done, for example, by the user by depressing a mouse button while the mouse cursor is over July 29, dragging the mouse cursor to August 3, and then releasing the mouse button while the mouse cursor is still over August 3.

The calendar grid 320 of FIG. 5, as controlled by navigation calendar 500, corresponds in many respects to the calendar grid 320 of FIG. 3 as described above. For example, the calendar grid 320 may be controlled by a header row with buttons for navigating to different dates or for changing the view. This header row also contains 'done' button 422, 'delete' button 424, and 'cancel' button 426 of the dashboard. The other modules of the accordion section 430 are similar to those of FIG. 4A as discussed above.

The grid 320 as illustrated in FIG. 5 differs from FIG. 4, however, in that the grid 320 illustrates the child events for a selected event 322. The 'Trip to San Francisco,' as selected in the context of FIG. 4, has resulted in the display of a new, calendar application workspace that reflects the child events for the aforementioned parent event 322 (i.e., the trip to San Francisco). As reflected in FIG. 5, a total of five child events are displayed. Each of the five events are children of the parent—the trip to San Francisco—and are part of a hierarchy. A conceptual discussion of event hierarchies may be found with respect to FIG. 7. Each child event may be referred to as a sibling of another child event in that they have the same parent.

In FIG. 5, the grid 320 is shown in week view. As in FIG. 4A, the view selection tool bar in FIG. 5 allows the user to change the calendar grid 320 to other views. Since only sibling events at the current level of the hierarchy are shown on calendar grid 320, only the child events of the selected event of FIG. 4B (i.e., 'Trip to San Francisco') appear in each of these views. If, in FIG. 5, the user selects the map link of the view selection tool bar 344, the user will see only the child events of the 'Trip to San Francisco' on the map. As discussed in the context of FIG. 3 and FIG. 4A, in map view, the user may use navigation calendar 500 to limit which day's events are displayed on the map.

Figure 1A:
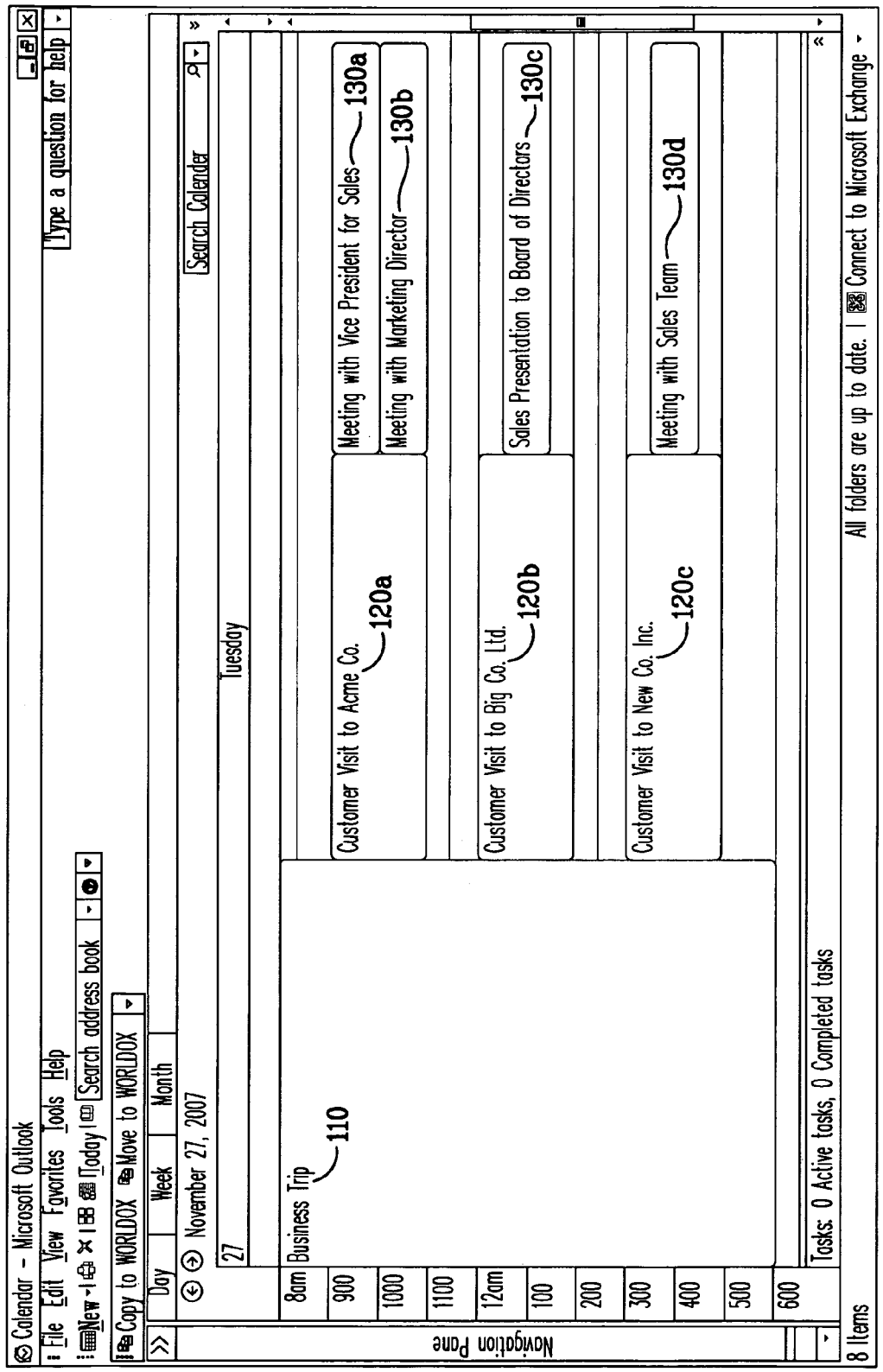
FIG. 1A illustrates a prior art calendaring system showing a hierarchy of events appearing to be in conflict.
Figure 1B:
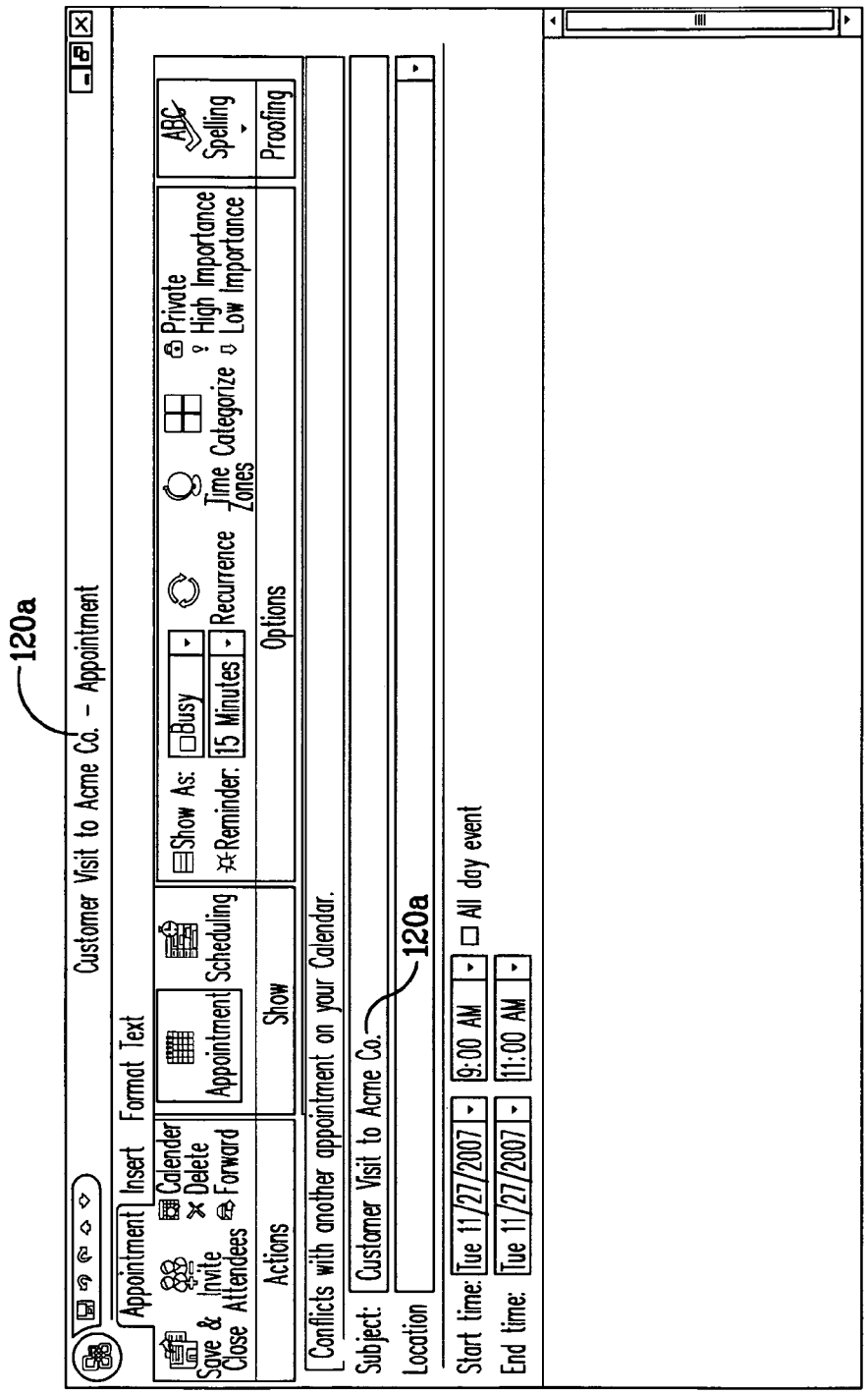
FIG. 1B illustrates an appointment editing window of the prior art calendaring system as shown in FIG. 1A, the appointment editing window expressly indicating a scheduling conflict within the hierarchy of events.

FIG. 5 illustrates an improvement over prior art calendaring systems like those disclosed with respect to FIG. 1A. Should the hierarchical events of FIGS. 4 and 5 have been displayed in the context of a prior art calendaring system, an apparent scheduling conflict would be displayed. For example, the trip to San Francisco from FIG. 4 (the parent event) extends from August 30 to November 2. In a prior art calendar system, the four days would be reflected as being busy. Any subsequent scheduling activity—such as the trip to the museum on July 31 at 2:00 PM and the dinner engagement at 8:30 PM—would generate a calendaring conflict like that shown in FIG. 1B. This conflict would be reflected notwithstanding the fact that the museum and dinner engagement are a hierarchical part (i.e., children) of the trip to San Francisco (i.e., the parent event). As a result of the hierarchical calendaring functionality of the present invention, no scheduling conflict is reflected.

Figure 6:
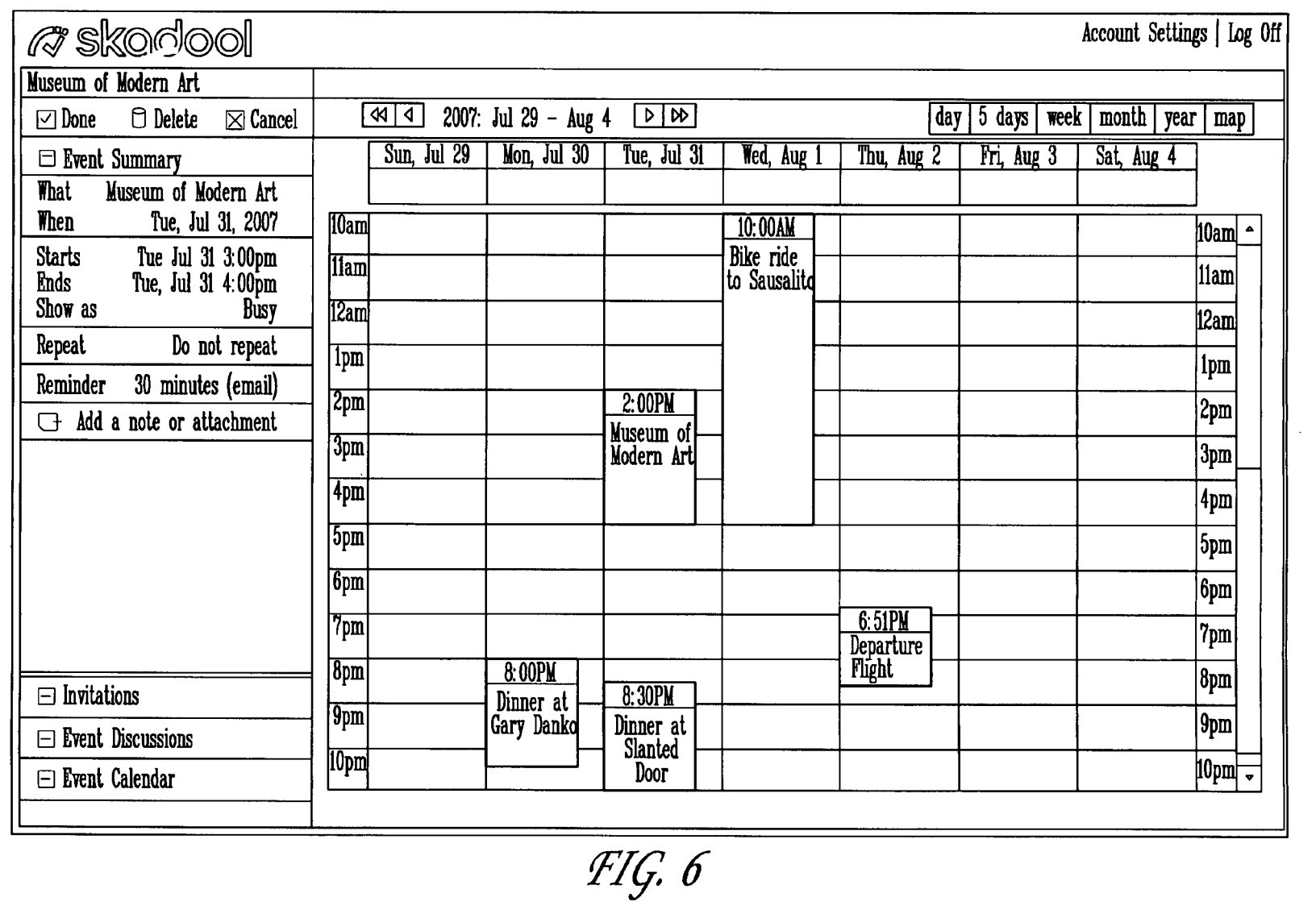

FIG. 6 illustrates the selection of a child event in calendar application 200, the child event being a part of a larger hierarchical event. In FIG. 6, the child event has been selected, which results in the display of corresponding event information in the dashboard 400. Like the dashboard and event summary information as presented in FIG. 4, the dashboard 400 now presents child event specific information including when, where, and so forth. The event calendar module 470 may be selected (and expanded) such that a user may view and select child events to navigate deeper into the event hierarchy. Conversely, a user may select the done button to navigate up and/or out of the event hierarchy.

New child events may be created on calendar grid 320 of FIG. 5 by clicking or dragging the mouse on the grid over the desired scheduled time for the event. As a result, an event dashboard would appear giving the user the ability to edit additional information about the new sibling event, Selecting the 'Done' button of the event dashboard would save the edits and result in the creation of the new event.

Figure 7:
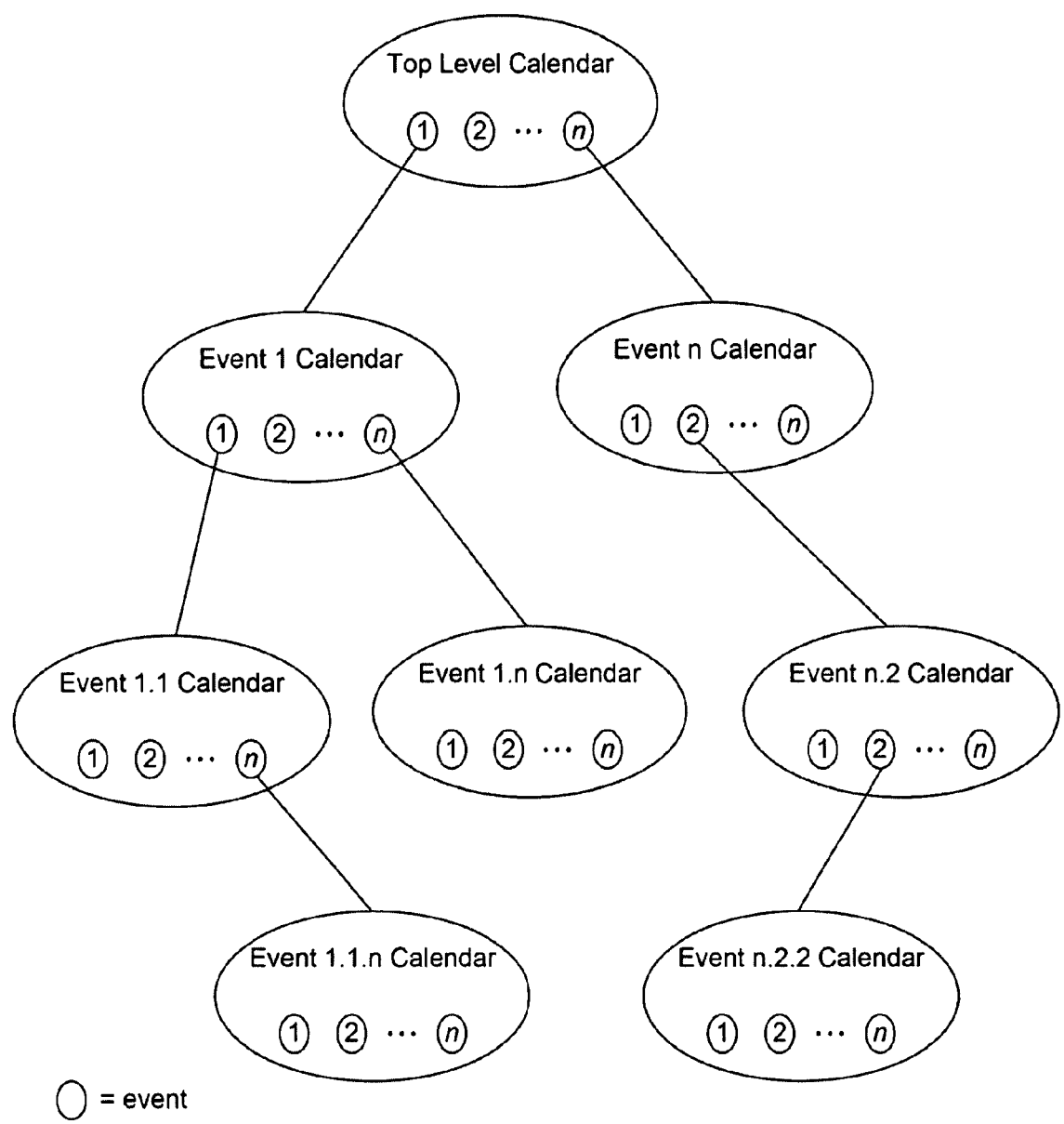
FIG. 7 illustrates a conceptual embodiment of an event hierarchy.

FIG. 7 conceptually illustrates an event hierarchy. Various means of navigating through the levels of the hierarchy are available. For example, in a calendar workspace, a particular event may be selected. A link may then be activated to give access to the descendants of the selected event. This link may be a button, tab, hypertext, checkbox, or any other object in the workspace including an accordion section of a dashboard. When the link is selected, the events on the workspace may be replaced with the children of the selected event.

The aforementioned link may be part of a form that appears when an event is selected, such as an event dashboard. Events displayed as a result of the initial selection may themselves be selected thereby causing the form to be replaced (or covered) with the form for the newly selected event. This form, too, may include links providing for navigation of the hierarchy of events.

An event path may be displayed to allow a user to navigate through a hierarchy. For example, if the calendar workspace is filled with exemplary calendar 1.1.$n$ from FIG. 7, the displayed path would be Top Calendar>Event 1>Event 1.1>Event 1.1.$n$. Each of the calendars/events in the path, may serve as link to navigate back up (or down) to a given layer in the hierarchy. When one of the links is selected, the system may navigate to the level in the event hierarchy where the corresponding event appears selected (or no event appears selected if at the top of the hierarchy).

In another embodiment, an event page may be opened for a selected event. This page may be opened, for example, by double clicking on an event. Alternatively, a selected event on a calendar may have a page-level tab (or a top-level tab like the top level tabs 330 shown in FIG. 3) that, when selected, exposes the event page for that selected event. While any number of methods may be used to open an event page associated with an event, this page may have alternative views available for selection. A set of tabs on the event page may allow the user to select what is displayed on the event page. For example, these tabs may cause the event page to be updated with the corresponding view. These tabs could appear in the left column of the event page or anywhere on the event page. Some examples of possible views may include event information, event conversations, map view, event photos, and event calendar.

Selecting the event calendar tab may cause the event page to be loaded with a calendar workspace that may be filled with that event's children events. These events may be displayed in a calendar application grid. A navigation calendar may also appear to provide a way to control what set of dates are displayed in the workspace. The events on this event calendar may also have event pages that may be opened in a similar manner with their own calendar tabs thus enabling a deeper hierarchy of events. As in the above example, the event path may be displayed to provide links to navigate back up the hierarchy. For example, selecting a link may cause the application to display the event page of the corresponding event.

A new window, too, may open the event page for a selected event or the calendar of a selected event. By opening a new window, navigating back up to a given layer of the hierarchy may occur by selecting the appropriate open window to bring it to the foreground if the windows overlap. Windows, in some embodiments, may be tiled. Any combination of the above methods or use of other methods for navigating through a hierarchy of events is within the scope of the present invention.

In one embodiment, a single column within the workspace corresponding with a day may be used for both events and time reservations. In this case, each region of the column corresponding to a region in time may have the entire width of the column filled with shading to indicate the time reservation for that region of time. For instance, the area could be filled with semi-transparent grey for busy, semi-transparent yellow for tentative, or not filled at all for free. The events may appear on top of the shading and may not fill the entire width of the column so that the time reservation underneath them can be seen. This is illustrated in FIG. 5, for example, which shows events that are narrower than the day columns. Time reservations of 'busy' are shown as semi-transparent background shading corresponding to the scheduled time of the events. These reservations can be seen to the right of the events in the area of the day column not covered by the events.

The organization of events in a hierarchy aids the user of the calendar to better express their availability for a given activity. For example, in one embodiment of a calendar system supporting the presently described hierarchical events scheduling system, the availability of an individual that is reflected on the calendar workspace may be derived from the time reservations of all events for that individual. This derivation may be based on hierarchical relationships relative to the current level of the hierarchy displayed in the workspace.

For example, a vacation event at the top level of the hierarchy may reserve time as busy for that vacation. When the user navigates to the calendar associated with the vacation, event, however, the time reservation associated with that vacation, event may be shown as free. In such an embodiment, at the top level calendar the user may create the vacation event to block time so no events are scheduled at this level of the event hierarchy while they are on vacation. In the vacation calendar, however, this time reservation will be removed (shown as free) and the user may be free to schedule their vacation events. The time reservations associated with the children of the vacation may appear in the vacation calendar but not the time reservation the vacation event has on the vacation's parent calendar. This is illustrated, for example, in FIG. 5 where the time reservation for the parent event (i.e., 'Trip to San Francisco') is not shown. For the same reason, the time reservations of all the ancestors (i.e., ancestor events) of a given calendar may not be displayed in that calendar.

A given system implementing the presently disclosed hierarchical events may choose to display the time reservations for other offspring of the calendar's ancestors as these might be of interest within a given calendar. For instance, one might have a conference call event scheduled with their manager while on a business trip. The business trip event might be on the same calendar as the conference call. It may be useful to display the time reservation for that conference call on the business trip's calendar so that customer meetings are not scheduled at the same time.

There are additional ways a given implementation may choose to display time reservations in the practice of the presently disclosed invention. For example, a user who has a business trip on their top level calendar with its own associated calendar may choose to not create a busy time reservation on their main calendar for that business trip. The user may make this choice as to allow conference calls to be scheduled when they are free during that business trip. Any time reservations for the children of that business trip may propagate up the hierarchy to prevent these conference calls from being scheduled while they are traveling or holding meetings during that business trip.

To handle these aforementioned cases related to time reservations, a scheduling system may choose to implement a method for displaying the availability of an individual in the calendar workspace. Through such a method, the individual's availability at a given time is determined by evaluating the time reservations for all of that individual's events at all levels of the hierarchy that are scheduled at the same time. The exception to this method may be that the time reservations for the parent and other ancestors of the calendar displayed in the workspace are ignored.

To display that individual's availability on the calendar workspace, the time reservation of all other events (which includes the events displayed on the workspace, their descendants, and all other offspring of the ancestors but not including the ancestors) could have their time reservations overlaid onto the calendar workspace. Such overlay may occur with some degree of semi-transparency. As a result, the darkness and color help to determine not only if the individual is available but also if they are overbooked at a given time and the severity of the same (e.g., darker shading being equated with a more extensive overbooking).

This same approach would easily extend when displaying the collective availability of a group of individuals or resources. This approach becomes increasingly powerful when these individuals or resources are invited to the same hierarchical event. As a result, these individuals will share a common event calendar within their personal event hierarchies, which can serve to reserve time on all of their personal calendars for the purpose of future scheduling of child events of the event to which they are invited.

Some embodiments may not display any time reservations for events that are not contained within the calendar that is shown in the workspace to keep the system simple. Optionally, some embodiments may show all time outside the parent's start and end time as not available. The system may enforce the start and end times of events on a calendar so that they fall within the start and end time bounds of the parent event. This may be done by not allowing the child events to be scheduled outside the bounds of the parent or by appropriately modifying the bounds of the parent event to accommodate the schedule times of its child events.

In some instances, an event may be a child of one event and/or a parent of many events. An event may also have multiple parents. An event containing children may have a calendar associated with the event and that contains these children. The event may he considered to be the container for other events. However, it may be useful to present event hierarchy to the end user using the concept of a calendar as users are familiar with calendars acting as containers of events.

Figure 8:
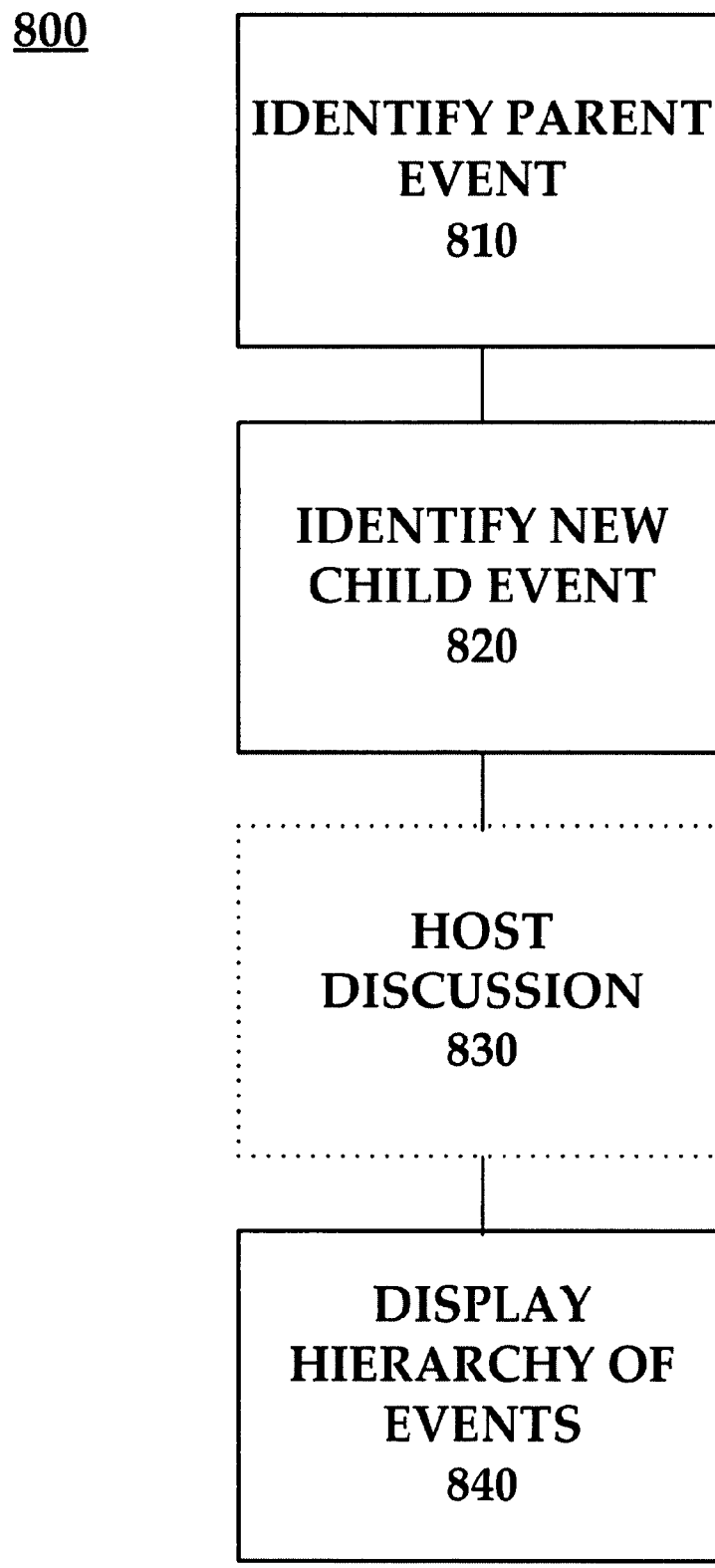
FIG. 8 illustrates an exemplary method for organization of a hierarchical event.

FIG. 8 illustrates an exemplary method 800 for organization of a hierarchical event. In step 810, a parent event is identified. Selection of a parent event in step 810 may be akin to the selection illustrated and discussed in the context of FIG. 4. In step 820, a new child event is identified as a part of a hierarchy of events. Entry of this new child event may occur as a result of edits and other scheduling manipulations made via calendar application workspace like that shown in FIG. 5.

The newly entered child event is then displayed in step 840 in a fashion similar to that illustrated with respect to FIGS. 5 and 6 in that no scheduling conflict is shown between the parent and child as those are both a part of the same event hierarchy. Optional step 830 provides for the hosting and occurrence of a discussion in a collaborate environment. Such an environment may be accessed or generated through the likes of a discussion module as referenced in the context of FIG. 4.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A system for organization of hierarchical events, the system comprising:
   a first computing sub-system that generates a parent event classifying a hierarchy of events, the first computing sub-system including at least one processor and being associated with a planner of the parent event;
   a second computing sub-system that generates a new child event corresponding to the hierarchy of events, the second computing sub-system including at least one processor and being associated with an invitee to at least one event from the hierarchy of events, wherein availability of an individual at a given level in the hierarchy of events is determined by time reservations of all events for the individual subject to a hierarchical relationship of all the events; and
   a server that generates information related to a display of the new child event in a calendar application displayed at the computing subsystems associated with the planner and the invitee, the new child event scheduled for a first person for a first time period which overlaps with a second time period scheduled for the parent event for the first person, the new child event displayed as not conflicting with the parent event.

2. The system of claim 1, wherein the server further generates a collaborative organization environment for a discussion concerning the new child event.

3. The system of claim 2, wherein the discussion further includes feedback generated by at least one of the computing sub-systems associated with the planner and the invitee.

4. The system of claim 2, wherein the collaborative organization environment provides information regarding a service or attraction related to the new child event.

5. A method for organization of hierarchical events, the method comprising:
   receiving an identification of a parent event in a first calendar application workspace at a computing device, the parent event classifying a hierarchy of events;
   receiving an identification of a new child event at the computing device, wherein the new child event corresponds to the hierarchy of events, wherein availability of an individual at a given level in the hierarchy of events is determined by time reservations of all events for the individual subject to a hierarchical relationship of all the events; and
   executing instructions stored in memory, wherein execution of instructions by a processor displays the new child event in a second calendar application workspace, wherein the new child event is a scheduled event having a first time period which overlaps with a second time period scheduled for the parent event for a first person, the new child event in the hierarchy of events displayed as not having a calendaring conflict with the parent event.

6. The method of claim 5, wherein the second calendar application workspace displays only a child event and associated siblings, the second calendar application workspace displayed as a result of the processor executing instructions stored in memory.

7. The method of claim 5, wherein the first calendar application workspace displays different sets of events based on the identification of a current level of the hierarchy of events.

8. The method of claim 5, wherein identification of the parent event in the first calendar application workspace results in the display of a workspace dedicated to the hierarchy of events.

9. The method of claim 8, wherein the hierarchy of events includes the new child event.

10. The method of claim 5, wherein the execution of instructions by the processor further generates the second calendar application workspace, the second calendar application being a sub-set of the first calendar application workspace.

11. The method of claim 5, wherein the first calendar application workspace is independent of the second calendar application workspace.

12. The method of claim 11, wherein the first calendar application workspace is displayed independent of the second calendar application workspace.

13. The method of claim 5, wherein the new child event includes a time of day interval for at least one day of the week within a range of dates defined by a starting date and an ending date of the parent event.

14. The system of claim 5, wherein the execution of instructions by the processor further generates a collaborative organization environment for a discussion concerning the new child event.

15. The method of claim 14, wherein the discussion concerning the new child event occurs amongst invited participants.

16. The method of claim 14, wherein the discussion concerning the new child event occurs through an instant messenger application stored in memory and activated through the execution of the application by the processor.

17. The method of claim 14, wherein the discussion concerning the new child event occurs through a native messaging application stored in memory and activated through the execution of the application by the processor.

18. The method of claim 14, wherein the discussion concerning the new child event occurs through a message board.

19. The method of claim 15, wherein the discussion concerning the new child event includes the processor executing a polling application stored in memory, wherein polling takes place amongst invited participants.

20. The method of claim 15, wherein the invited participants for the new child event differ from the invited participants for a sibling event to the new child event.

21. The method of claim 15, wherein the invited participants for the new child event differ from the invited participants for the parent event.

22. The method of claim 15, wherein a participant to the discussion creates a new child event.

23. The method of claim 14, wherein an entity identifying the parent event has been granted access to the collaborative organization environment by the owner of the parent event.

24. The method of claim 23, wherein the entity identifying the parent event has been granted access to the collaborative organization environment through the use of a keyed-URL.

25. The method of claim 23, wherein the entity identifying the parent event has been granted access to the collaborative organization environment through the use of a password.

26. The system of claim 14, wherein the collaborative organization environment provides information regarding a service or attraction related to the new child event.

27. The method of claim 5, wherein availability of a group of individuals at a given level in a hierarchy of events for each individual is determined by time reservations of all events for each of the individuals from the group of individuals based on the hierarchical relationship of each of the events for all of the individuals relative to the given level of the hierarchy.

28. The method of claim 5, wherein the execution of instructions by the processor further displays the availability of the individual at the given level in the hierarchy of events.

29. The method of claim 27, wherein the execution of instructions by the processor further displays the availability of the group of individuals at the given level in the hierarchy of events.

30. The method of claim 28, further comprising displaying the availability of the individual at the given level in the hierarchy of events, wherein displaying the availability of the individual includes overlaying time reservations.

31. The method of claim 30, wherein the time reservations are displayed such that they are semitransparent in appearance.

32. The method of claim 31, wherein a darkness associated with an overlaid time reservations indicate a severity of an overbooking of the individual.

33. The method of claim 31, wherein a color associated with an overlaid time reservations indicate a severity of an overbooking of the individual.

34. The method of claim 27, wherein the time reservations of ancestor events for the given level in the hierarchy of events for each individual are excluded from the determination of the availability of each individual from the group of individuals.

35. The method of claim 34, wherein the execution of instructions by the processor further displays the collective availability of the group of individuals at the given level in the hierarchy of events.

36. The method of claim 35, wherein displaying the collective availability of the group of individuals includes overlaying time reservations.

37. The method of claim 5, wherein the execution of instructions by the processor further displays a map corresponding to a location of one or more events from the hierarchy of events.

38. The method of claim 37, wherein the map zooms in on a particular region of the map in response to user interactions with the one or more events as received at the computing device.

39. The method of claim 37, wherein the display pans to a particular region of the map in response to user interactions with the one or more events as received at the computing device.

40. The method of claim 37, wherein the execution of instructions by the processor further displays a list of the one or more events displayed on the map.

41. The method of claim 40, wherein the map navigates to an event selected from the list of one or more events in response to the execution of instructions by the processor.

42. The method of claim 37, wherein selection of an event displayed on the map allows for editing of details corresponding to the event.

43. The method of claim 37, wherein the one or more events from the hierarchy of events displayed on the map are all child events of the same parent.

44. The method of claim 5, wherein the new child event is displayed in a calendar application workspace distinct from a display of the calendar application displaying the parent event.

45. The method of claim 14, wherein the collaborative organization environment provides information regarding an accommodation related to the new child event.

46. The method of claim 14, wherein the collaborative organization environment provides driving directions to the service or attraction.

47. The method of claim 26, wherein the service is a reservation service.

48. The method of claim 26, wherein the information is provided by a third-party.

49. A non-transitory computer-readable storage medium having embodied thereon a program, the program being executable by a processor to perform a method for organization of hierarchical events, the method comprising:
receiving an identification of a parent event in a first calendar application workspace, the parent event classifying a hierarchy of events;
receiving an identification of a new child event, wherein the new child event corresponds to the hierarchy of events, wherein availability of an individual at a given level in the hierarchy of events is determined by time reservations of all events for the individual subject to a hierarchical relationship of all the events; and
displaying the new child event in a second calendar application workspace, wherein the new child event is a scheduled event in the hierarchy of events and scheduled for a first time period for a first person which overlaps with a second time period scheduled for the parent event for the first person, the new child event displayed as not having a calendaring conflict with the parent event.

* * * * *